(12) United States Patent
Baldischweiler

(10) Patent No.: US 12,265,872 B2
(45) Date of Patent: Apr. 1, 2025

(54) CARD BODY FOR A CHIP CARD AND CHIP CARD

(71) Applicant: GIESECKE+DEVRIENT MOBILE SECURITY GMBH, Munich (DE)

(72) Inventor: Michael Baldischweiler, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/261,370

(22) PCT Filed: Jan. 19, 2022

(86) PCT No.: PCT/EP2022/025018
§ 371 (c)(1),
(2) Date: Jul. 13, 2023

(87) PCT Pub. No.: WO2022/157003
PCT Pub. Date: Jul. 28, 2022

(65) Prior Publication Data
US 2024/0303457 A1    Sep. 12, 2024

(30) Foreign Application Priority Data

Jan. 22, 2021 (DE) .................. 10 2021 000 335.7

(51) Int. Cl.
*G06K 19/077* (2006.01)
*G06K 19/02* (2006.01)
*G06K 19/04* (2006.01)

(52) U.S. Cl.
CPC ....... *G06K 19/07747* (2013.01); *G06K 19/02* (2013.01); *G06K 19/042* (2013.01); *G06K 19/07779* (2013.01)

(58) Field of Classification Search
CPC ............ G06K 19/07747; G06K 19/02; G06K 19/042; G06K 19/07779
See application file for complete search history.

(56) References Cited

U.S. PATENT DOCUMENTS

| 10,043,126 | B2 | 8/2018 | Pachler et al. |
| 2016/0180212 | A1 | 6/2016 | Herslow et al. |
| 2017/0316303 | A1 | 11/2017 | Pachler et al. |
| 2020/0257953 | A1 | 8/2020 | Lotya et al. |
| 2020/0364531 | A1* | 11/2020 | Lowe ............... G06K 19/07792 |

FOREIGN PATENT DOCUMENTS

| CN | 204463191 U | 7/2015 |
| DE | 102016107982 A1 | 11/2017 |

OTHER PUBLICATIONS

International Search Report from PCT Application No. PCT/EP2022/025018, Apr. 28, 2022.
Search Report from corresponding German Application No. 102021000335.7, Aug. 17, 2021.

* cited by examiner

*Primary Examiner* — Matthew Mikels
(74) *Attorney, Agent, or Firm* — Workman Nydegger

(57) ABSTRACT

A card body for a chip card, includes a module opening for receiving a chip module having a coil, a metal layer having a slot which extends from an outer edge of the metal layer to the module opening, and a plastic layer which is applied to one side of the metal layer. The module opening has a blind hole cut out of the plastic layer and the metal layer and an outer area which surrounds the blind hole which is cut out of only part of the height of the plastic layer. A further slot is provided in the outer region in the metal layer.

13 Claims, 3 Drawing Sheets

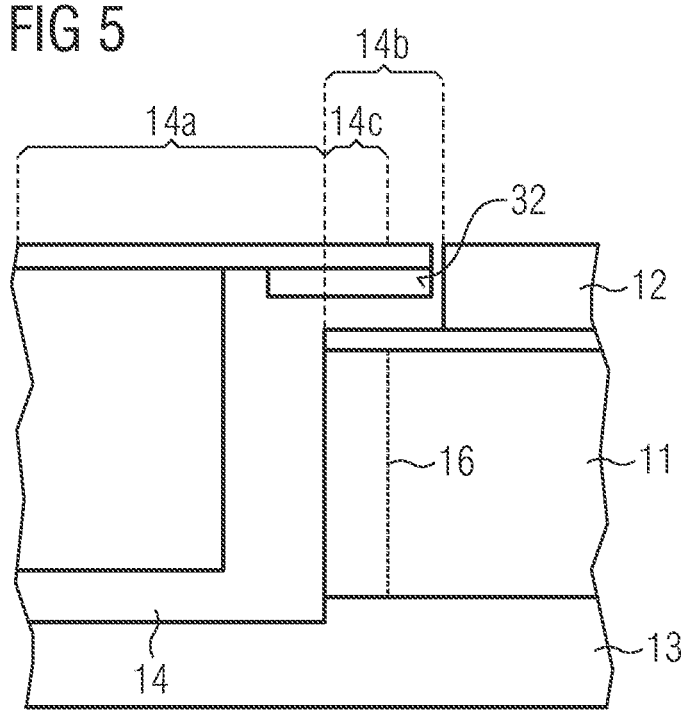

CARD BODY FOR A CHIP CARD AND CHIP CARD

BACKGROUND

The invention relates to a card body for a chip card and also to a chip card comprising a card body.

Card bodies are contemplated which have a metallic core in the form of a metallic core layer or a metallic core element, and also cards with dual interface (DI) functionality, in which the card body consists partly or entirely of metal. The energy coupling of DI systems with a two-coil system (SPS) is accomplished through metal structures having a gap, with which the magnetic/current flow is diverted into the metal faces.

The chip module is inserted into a cavity or a module opening of the card body.

The operation of such a card involves the use of a chip module which itself contains a coil (coil on module). This coil couples to the card body with a metal core. This coupling only operates when there is a slot in the metal card body.

The cavity design has to date been chosen such that, because of electromagnetic aspects, as large as possible a cavity or module opening is chosen, so as to increase the energy input into the chip module. As a result, however, the mechanical stability of the module is reduced.

SUMMARY

It is an object of the present invention, therefore, to enable a greater energy input into the chip module even in the case of relatively small module openings.

This object is achieved by a card body for a chip card and also by a chip card comprising a card body. Refinements and developments of the invention are specified in the dependent claims.

A card body of the invention for a chip card, comprising a module opening for accommodating a chip module with a coil, comprises a metallic layer having a slot which extends from an outer edge of the metallic layer to the module opening, and a plastics layer which is applied on one side of the metallic layer. The module opening here comprises a blind hole, which is made in the plastics layer and in the metallic layer, and an external region which surrounds the blind hole and is made in the plastics layer only to the extent of a part of the height of said layer, wherein in the metallic layer in the external region there is at least one further slot.

A basic concept of the present invention is to incorporate further slots or incisions in the external region of the module opening. The further slots have the effect of bundling the magnetic field lines, reducing eddy currents, and improving the coupling of the windings of the coil.

The metallic layer is present in the external region, and so the development of the magnetic flow around the individual windings of the coil and also the coupling between the individual windings are suppressed. Whereas magnetic coupling between the individual windings develops in the region of the blind hole, where there is no metallic layer, and so increases the quality of the coil, the coupling is suppressed in the region of the metal body. The development of the magnetic flow, moreover, is compressed and the magnetic flow, moreover, generates eddy currents in the metal body. This means that a considerable part of the energy absorbed by the chip card is lost through the eddy currents generated.

The one or more further slots, then, provide the possibility of providing a small module opening so that the module is stable in the card body, but nevertheless of realizing an energy input which is high for the small module opening. The greater the energy input, the better the performance of the chip card.

This has the advantage that the mechanical stability is increased and nevertheless the energy input can be kept high. The one or more further slots in the corner regions of the module opening enlarge to some extent the electrically active area for energy transfer. At the same time, however, the module opening is not enlarged over its full area, and so the mechanical stability of the relatively small module opening is retained. In summary, the one or more further slots in the corner regions of the module opening enable the mechanical design of a relatively small module opening with the electrical energy input of a relatively large module opening.

Since the coupling of energy into the metal card is substantially improved in accordance with the invention, there is a rise in the performance in the chip card. As a result of the further slots, there is a reduction in the eddy currents and an optimization of the magnetic field. Because of this, firstly, a rapid buildup of the magnetic field strength at a coil of the chip module is made possible, thus permitting more rapid starting of the chip or of the processor. Secondly, a higher magnetic field strength at a coil of the chip module is made possible, which permits more rapid operation owing to a higher operating frequency of the chip or of the processor.

The term "further slots" serves for the conceptual delimitation of these further slots in the external region of the module opening from the slot in the metal core that serves to limit eddy currents. These further slots, in the form of corner slots and parallel slots, are described below.

Provision may be made for at least one corner slot to extend in a slot region of the external region, starting from a corner region of the blind hole. These slots starting from the corners permit the above-described effects of field optimization. One to four corner slots may be provided, with each further slot extending from a different corner region of the module opening into the metallic layer. With just one slot it is possible to boost the energy input. With four slots, preferably arranged symmetrically, the energy input can be boosted further.

Provision may also be made for the at least one corner slot to extend at an angle of 45° to a border of the module opening. It has emerged that this angle offers a good energy input in relation to the slot length.

Provision may be made for the at least one corner slot to have a length of 1 mm to 2 mm. Measurements have shown that a good energy input can be realized with such lengths.

Provision may be made for at least one parallel slot to extend parallel to a wall of the blind hole in a slot region of the external region. These slots running parallel to the circumference or the walls of the blind hole or of the module opening permit the above-described effects of field optimization. One to four parallel slots may be provided, with each further slot extending in the case of a different wall region of the module opening in the metallic layer. With just one slot, it is possible to boost the energy input. With four slots, preferably arranged symmetrically, the energy input can be boosted further.

Provision may also be made for a length of the at least one parallel slot to correspond at least to the length of a wall of the blind hole. It has emerged that this relationship between slot length and side length of the blind hole offers a good energy input.

Provision may be made for a distance of the at least one parallel slot to a wall of the blind hole to be between 0.8 mm and 1 mm. It has emerged that this distance offers a good energy input in relation to the slot length.

Provision may also be made for a further plastics layer to be applied on a second side of the metallic layer, opposite to the one side, and for the internal region of the module opening to extend into the further plastics layer. Accordingly, the metallic layer or the metallic core in the region of the module opening is completely perforated, thus improving the electrical conditions, especially the transfer of energy.

Provision may be made for the slot region of the external region and an unslotted region of the external region to be the same size. This symmetrical arrangement of the two regions has proven to be effective for a good energy input.

A chip card of the invention comprises a card body as described above and a chip module, embedded at least partly into the module opening of the card body, with a coil. The advantages and modifications which apply are the same as those described above.

Provision may be made for the chip module to have a base element carrying the coil, and for the base element to lie on the plastics layer in the exterior region of the module opening. Accordingly, in a simple way, it is possible to prevent direct electrical contact between the chip module and the metallic layer. The chip module and the card body communicate with one another only via the coils.

Provision may also be made for the slot region of the external region and an unslotted region of the external region to be the same size and for the coil to cover a third of each of the blind hole of the module opening, the slot region of the external region, and the unslotted region of the external region of the module opening. Hence it is possible to utilize ⅔ of the windings of the coil of the chip module for the energy input. At the same time, ⅔ of a contact face of the chip module can be utilized for mechanical connection. The slot region is utilized twofold-electrically for the energy input, and mechanically for stable mounting of the chip module.

BRIEF DESCRIPTION OF THE DRAWINGS

The present invention is described illustratively below with reference to the appended drawings.

FIG. 5 shows a detail of the module opening of the sectional representation of the chip card from FIG. 1.

DETAILED DESCRIPTION OF VARIOUS EMBODIMENTS

Figure 1:
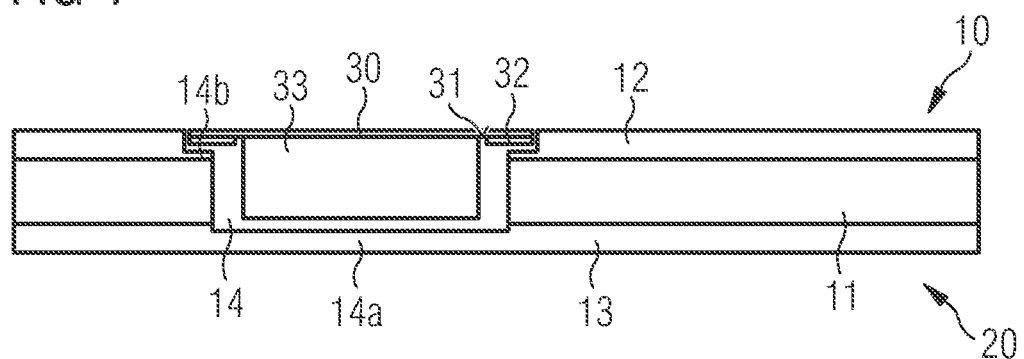
FIG. 1 shows a sectional representation of a chip card with card body and chip module.

FIG. 1 shows a card body 10 for a chip card 20. The chip card 20 here comprises the card body 10 and also a chip module 30.

The card body 10 comprises a metallic layer 11, in the form, for example, of a core or of a layer composed of a stainless steel alloy, with a thickness of 400 μm.

A main side or surface of the card body 10 is covered or laminated with a plastics layer 12. An opposite second main side or surface of the card body 10 is covered or laminated with a further plastics layer 13. The two plastics layers 12, 13 may for example consist of PET, PC, PVC or PP and have a thickness of 200 μm. The thickness of the card body 10 ought not to exceed the maximum thickness of a chip card body in accordance with ISO 7810.

A module opening 14 is made in the main side or surface of the card body 10. The module opening 14 extends through the entire plastics layer 12, the entire metallic layer 11, and part of the plastics layer 13. The module opening 14 is made by means, for example, of a laser operation or milling operation.

The module opening 14 has a blind hole 14a, which is made in the plastics layer 12 and in the metallic layer 11, and an external region 14b which surrounds the blind hole 14a and which is made in the plastics layer 12 only to an extent of part of the height of said plastics layer 12.

The chip module 30 is arranged in the module opening 14, where it is adhesively bonded, for example. The chip module 30 comprises a base element 31, which carries the coil 32. The base element 31 lies on the plastics layer 12 in the external region 14b of the module opening 14.

The chip module 30 further comprises a chip 33, which is secured, for example, in an encapsulating compound on an underside of the base element 31. The chip 33 is supplied via the coil 32 with energy and/or signals. Accordingly, an electromagnetic field emerging from the metallic layer 11 can be coupled into the coil 32.

Figure 2:
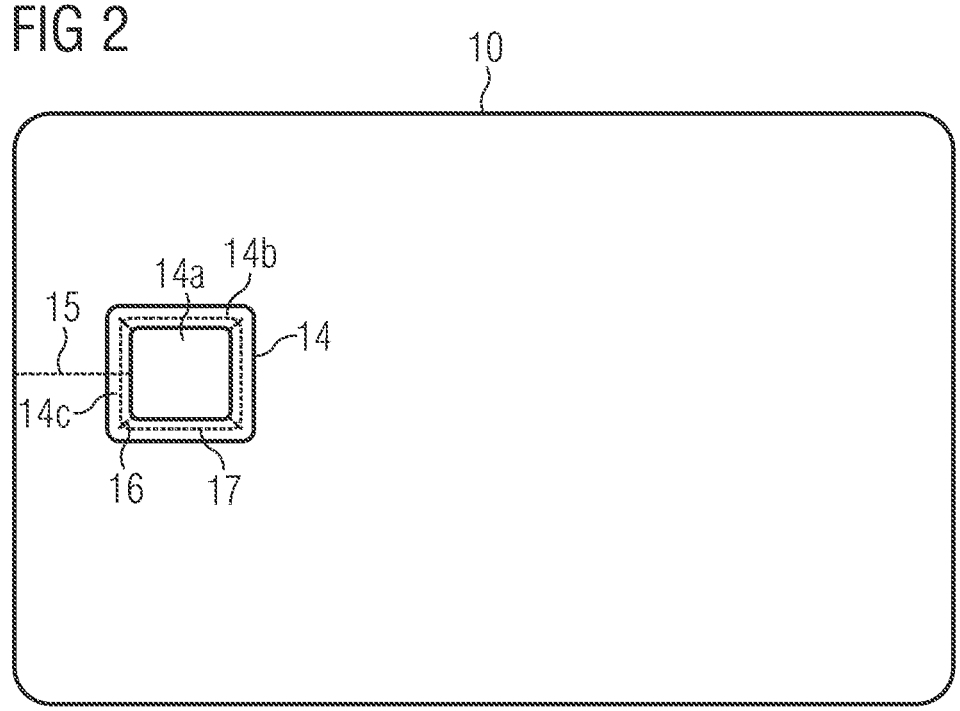
FIG. 2 shows a plan view of a card body for a chip card.

Represented in FIG. 2 is a card body 10 in plan view. In the metallic layer 11 there is a slot 15 which extends from an outer edge of the metallic layer 11 to the module opening 14. In FIG. 2, the slot 15 is represented on a left-hand side; the slot 15 may also be arranged on a right-hand side of the card body 10. The slot 15 serves to prevent eddy currents.

The slot 15 has, for example, a width of between 30 μm and 100 μm, preferably between 50 μm and 80 μm. The slot 15 serves to prevent eddy currents in the vicinity of the module opening 14 and is therefore formed in the metallic layer 11. The slot 15 is typically formed in the metallic layer 11 before said layer is laminated to the plastics layers 12 and 13. It is therefore customary for the slot 15 to run only in the metallic layer 11 and not in the plastics layers 12 and 13.

In the metallic layer 11 there is at least one corner slot 16, which extends, starting from a corner region of the blind hole 14a, into a slot region 14c of the external region 14b. In this example, four corner slots 16 are provided, each extending at an angle of 45° to a border of the module opening 14. Each of the corner slots 16 has a length of 1 mm to 2 mm.

Also provided in the metallic layer 11 is at least one parallel slot 17 in a slot region 14c of the external region 14b, and extending parallel to a wall of the blind hole 14a. A length of the parallel slot 17 corresponds at least to the length of a wall of the blind hole 14a. The distance of the parallel slot 17 to a wall of the blind hole 14a is between 0.8 mm and 1 mm. In this example, four parallel slots 17 are provided, each running parallel to one of the four walls of the blind hole 14a.

The individual parallel slots 17 and corner slots 16 are formed separately from one another, and so do not communicate with one another outside the blind hole 14a. The parallel slots 17 and corner slots 16 may be formed in any combination. Thus it is possible for only parallel slots 17, only corner slots 16 or both kinds of slot to be present. For each of the two kinds of slot there may be one, two, three or four slots provided in the slot region 14c.

The module opening 14 in this example has dimensions of 8 mm times 9 mm and a depth of about 250 μm.

Figure 3:
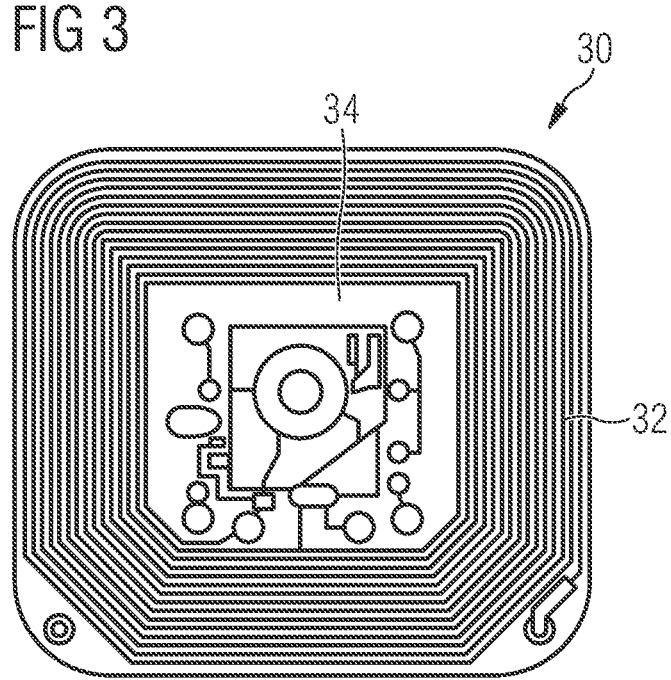
FIG. 3 shows a lower view of a chip module.

FIG. 3 shows a lower view of the chip module 30 with a central contact region 34 for contacting the chips, which are not shown here, or an integrated circuit. The windings of the coil 32 surround the contact region 34. In this example, the coil 32 has fifteen windings. The coil 32 serves for the transmission of signals and/or for the input of energy for the chip of the chip module.

Figure 4:
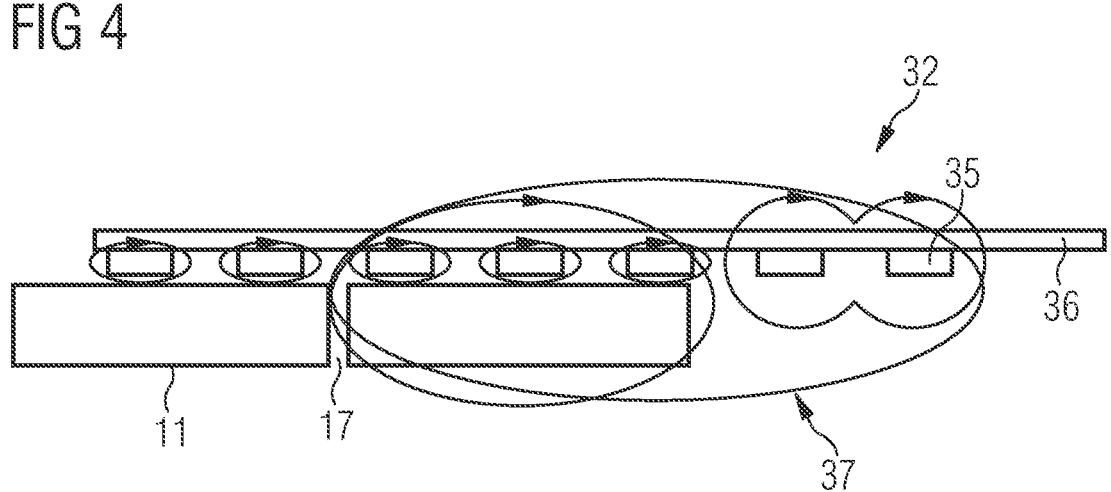
FIG. 4 shows a schematic representation of the magnetic flow in a region of the chip module.

FIG. 4 shows a schematic representation of the magnetic flow in a region of the chip module 30. The coil 32 is arranged, with its individual windings 35, on a module tape 36, for example.

In this example, there are two windings in the module opening 14 which are therefore unaffected by the covering of the metal. In the case of the next three windings, the formation of eddy current is minimized by the parallel slots 17 and/or the corner slots 16. The remaining two windings are completely affected by the damping properties of the metal body or of the metallic layer 11.

FIG. 4 shows the course of the magnetic flow 37 around the individual windings 35 of the coil 32. Whereas in the region of the module opening 14 or of the blind hole 14a there is a magnetic coupling between the individual windings 15, and the quality of the coil 32 is therefore increased, the coupling is suppressed in the region of the metal body. Moreover, the development of the magnetic flow 37 is compressed, and the magnetic flow 37, moreover, generates eddy currents in the metal body. This means that the energy absorbed is lost as a result of the eddy currents generated.

The parallel slots 17 and/or the corner slots 16 eliminate or at least reduce the suppressive influence of the metallic layer 11. Here there is a magnetic coupling between the individual windings 35, thereby increasing the energy input.

FIG. 5 shows a detail of the module opening 14 of the sectional representation of the chip card 20 from FIG. 1.

Represented is the module opening 14 in the plastics layer 12, in the metallic layer 11 and in the plastics layer 13. The module opening 14 has a blind hole 14a, and an external region 14b which surrounds the blind hole 14a and which is made in the plastics layer 12 only to the extent of part of the height of said layer 12.

Represented here in the metallic layer 11 is a corner slot 16, which extends, starting from a corner region of the blind hole 14a, into a slot region 14c of the external region 14b. The corner slot 16 extends at an angle of 45° to a border of the module opening 14 and has a length of 1 mm to 2 mm. Likewise running in the slot region 14c of the external region 14b is a parallel slot, which is not represented here.

The slot region 14c of the external region 14b and a remaining, unslotted region of the external region 14b are the same size in this example. This remaining, unslotted region of the external region 14b surrounds the slot region 14c of the external region 14b. It has emerged that this arrangement represents a good trade-off between mechanical stability and electrical performance of the chip.

Furthermore, the slot region 14c of the external region 14b and the remaining, unslotted region of the external region 14b may be the same size and the coil 32 may cover a third of each of the blind hole 14a of the module opening 14, the slot region 14c of the external region 14b, and the remaining, unslotted region of the external region 14b of the module opening 14. With this arrangement as well it has emerged that it represents a good trade-off between mechanical stability and electrical performance of the chip.

The performance of the chip and hence of the chip card are dependent how quickly it is possible to build up a minimum amount of the magnetic field strength at the coil 32 and how quickly this field strength increases.

Beyond a certain minimum amount of the magnetic field strength at the coil 32, the energy input is sufficient for operation of the chip. This minimum amount may be, for example, 1.5 amperes per meter (A/m). The quicker this minimum amount is achieved, the sooner the chip card is ready for operation. The corner slots 16 and the parallel slots 17 are beneficial to the propagation of the electromagnetic field to the coil 32, allowing the minimum amount of the magnetic field strength at the coil 32 to be achieved rapidly. At the same time, the corner slots 16 and the parallel slots 17 reduce the development of eddy currents, so further improving the energy input into the chip card.

The increase in the magnetic field strength at the coil 32 determines when the chip reaches its maximum performance. Typically there is a saturation region present in which the performance of the chip does not increase further in spite of increasing magnetic field strength. The performance of the chip may be expressed, for example, in computing operations per unit time such as one second. Here again, the corner slots 16 and the parallel slots 17 are beneficial to the increase of the electromagnetic field at the coil 32, since the corner slots 16 and the parallel slots 17 enable more effective and quicker propagation of the electromagnetic field and hence of the magnetic field strength at the coil 32.

Overall, the corner slots 16 and the parallel slots 17, and the associated smaller module opening 14, produce a better energy input or a better incoupling of energy than with a larger module opening with the entire extent of the smaller module opening 14 plus the corner slots 16 and the parallel slots 17.

By means of the smaller module opening 14 with the corner slots 16 and the parallel slots 17, therefore, it is possible to achieve increased chip performance in conjunction with increased mechanical stability.

The invention claimed is:

1. A card body for a chip card, comprising a module opening for accommodating a chip module with a coil, having a metallic layer with a slot which extends from an outer edge of the metallic layer to the module opening,
   and having a plastics layer which is applied on one side of the metallic layer,
   wherein the module opening comprises a blind hole made in the plastics layer and in the metallic layer, and an external region which surrounds the blind hole and which is made in the plastics layer only to the extent of a part of the height of said layer,
   wherein in the metallic layer in the external region there is at least one further slot wholly contained within the external region.

2. The card body according to claim 1, wherein at least one corner slot extends in a slot region of the external region, starting from a corner region of the blind hole.

3. The card body according to claim 2, wherein the at least one corner slot extends at an angle of 45° to a border of the module opening.

4. The card body according to claim 2, wherein the at least one corner slot has a length of 1 mm to 2 mm.

5. The card body according to claim 1, wherein at least one parallel slot in a slot region of the external region extends parallel to a wall of the blind hole.

6. The card body according to claim 5, wherein a length of the at least one parallel slot corresponds at least to the length of a wall of the blind hole.

7. The card body according to claim 5, wherein a distance of the at least one parallel slot to a wall of the blind hole is between 0.8 mm and 1 mm.

8. The card body according to claim 1, wherein a further plastics layer is applied on a second side of the metallic layer, opposite the one side, and in that the blind hole of the module opening extends into the further plastics layer.

9. The card body according to claim 1, wherein the slot region of the external region and an unslotted region of the external region are the same size.

10. A chip card comprising a card body according to claim 1 and a chip module, embedded at least partly into the module opening of the card body, with a coil.

11. The chip card according to claim 10, wherein the chip module has a base element carrying the coil and in that the base element lies on the plastics layer in the external region of the module opening.

12. The chip card according to claim 10, wherein the slot region of the external region and an unslotted region of the external region are the same size and in that the coil covers a third of each of the blind hole of the module opening, the slot region of the external region, and the unslotted region of the external region of the module opening.

13. A card body for a chip card, comprising a module opening for accommodating a chip module with a coil, having a metallic layer with a slot which extends from an outer edge of the metallic layer to the module opening,
and having a plastics layer which is applied on one side of the metallic layer,
wherein the module opening comprises a blind hole made in the plastics layer and in the metallic layer, and an external region which surrounds the blind hole and which is made in the plastics layer only to the extent of a part of the height of said layer,
wherein in the metallic layer in the external region there are at least two further slots,
wherein at least one of the at least two further slots is a corner slot that is wholly contained within the external region and that extends in a slot region of the external region, starting from a corner region of the blind hole, and wherein at least one of the at least two further slots is a parallel slot in a slot region of the external region extends parallel to a wall of the blind hole.

\* \* \* \* \*